United States Patent
Abdalla et al.

(10) Patent No.: US 7,854,839 B2
(45) Date of Patent: Dec. 21, 2010

(54) FUEL FILTER ASSEMBLY WITH FLOW RESTRICTION VALVE

(75) Inventors: Wassem Abdalla, Cookeville, TN (US); Abby True-Dahl, Sparta, TN (US); Ismail Bagci, Cookeville, TN (US); Chad T. Brummitt, Algood, TN (US); Yiming Zhang, Cookeville, TN (US); Jeffrey A. Husband, Cookeville, TN (US)

(73) Assignee: Cummins Flitration IP, Inc., Minneaplois, MN (US)

( * ) Notice: Subject to any disclaimer, the term of this patent is extended or adjusted under 35 U.S.C. 154(b) by 520 days.

(21) Appl. No.: 11/869,187

(22) Filed: Oct. 9, 2007

(65) Prior Publication Data

US 2009/0090668 A1 Apr. 9, 2009

(51) Int. Cl.
*B01D 35/30* (2006.01)
*B01D 35/157* (2006.01)
*B01D 35/00* (2006.01)
*B01D 35/02* (2006.01)

(52) U.S. Cl. .................. 210/232; 210/235; 210/429; 210/430; 210/437

(58) Field of Classification Search ............... 210/232, 210/235
See application file for complete search history.

(56) References Cited

U.S. PATENT DOCUMENTS

| 5,362,390 | A | 11/1994 | Widenhoefer et al. |
| 5,846,417 | A | 12/1998 | Jiang et al. |
| 6,053,334 | A | 4/2000 | Popoff et al. |
| 6,113,781 | A | 9/2000 | Popoff et al. |
| 6,171,491 | B1 | 1/2001 | Popoff et al. |
| 6,495,042 | B1 | 12/2002 | Knight |
| 6,554,139 | B1 | 4/2003 | Maxwell et al. |
| 6,884,349 | B1 | 4/2005 | Jiang |
| 2007/0084432 | A1* | 4/2007 | Jensen et al. ............ 123/198 D |

OTHER PUBLICATIONS

U.S. Appl. No. 11/854,019, filed Sep. 12, 2007, title: Filtration System With A Variable Restriction Orifice, inventor: Forrest et al., 27 pages.
U.S. Appl. No. 11/935,619, filed Nov. 6, 2007, title: Fuel Filter Assembly With Flow Restriction Sleeve, inventor: Bagci et al., 25 pages.
International Search Report of PCT/US2008/070744, dated Jan. 5, 2009.
Written Opinion of the International Searching Authority of PCT/US2008/070744, dated Jan. 5, 2009.

* cited by examiner

Primary Examiner—Krishnan S Menon
Assistant Examiner—Benjamin Kurtz
(74) Attorney, Agent, or Firm—Hamre, Schumaan, Mueller & Larson, P.C.

(57) ABSTRACT

A "no filter, no run" filtration system that is designed to verify that an appropriate filter cartridge is installed. A flow control valve is provided on a standpipe to control the flow of fuel into the standpipe. The valve has a component that has a first position at which any flow through the flow passage past the valve is insufficient to permit engine operation, and a second position at which a greater amount of flow through the flow passage is permitted by the valve in an amount sufficient to permit engine operation, and the component rotates about the longitudinal axis when it moves from the first position to the second position and from the second position to the first position.

18 Claims, 5 Drawing Sheets

FUEL FILTER ASSEMBLY WITH FLOW RESTRICTION VALVE

FIELD

This disclosure generally pertains to the field of filtration, and more particularly to fuel filtration systems designed to safe-guard against damage to fuel injectors, associated fuel components, and engine malfunctions resulting from a missing or incorrect fuel filter.

BACKGROUND

Fuel filtration systems are known that are designed to completely prevent flow of fuel to an engine if no filter cartridge is installed or in the incorrect filter cartridge is installed. In these "no filter, no run" systems, not only must a filter be present, but the correct filter must be used, in order to allow fuel to flow to the engine.

SUMMARY

A "no filter, no run" filtration system that is designed to verify that a filter cartridge is present to safe-guard against damage to fuel injectors, associated fuel components, etc. and engine malfunctions. Fuel flow to the engine is generally prevented if a filter cartridge is not installed in order to prevent engine operation, and an appropriately designed filter cartridge is required to be used in order to permit sufficient fuel flow for engine operation.

A flow control valve is provided on a standpipe to control the flow of fuel into the standpipe. The valve can be axially moveable between closed and open positions, with one or more members on an installed filter cartridge designed to release the valve to permit the movement from the closed position to the open position to allow full fuel flow. A spring biases the valve back to the closed position upon removal of the filter cartridge.

In one embodiment, a standpipe includes a valve having a component that has a first position at which flow (if any) through the flow passage past the valve is insufficient to permit engine operation, and a second position at which flow through the flow passage is permitted by the valve in an amount sufficient to permit engine operation, and the component rotates about the longitudinal axis when it moves from the first position to the second position and from the second position to the first position.

Rotation of the valve component is caused by the filter cartridge end plate when the filter cartridge is installed. In particular, the end plate includes at least one protrusion extending therefrom into the interior space of the filter at a position offset from the central axis. The protrusion includes an angled actuating edge that is at an acute angle relative to the central axis. The angled actuating edge engages the valve component and causes it to rotate.

In another embodiment, the valve is disposed on an exterior of the standpipe outside the internal flow passage, and the valve is moveable between a closed position at which flow (if any) through the flow passage is insufficient to permit engine operation and an open position at which flow through the flow passage permits engine operation. The valve includes a valve stop that is rotatable about the longitudinal axis when the valve moves between the closed and open positions and a valve cap that is engaged with the valve stop. In addition, the valve stop and the valve cap are movable in an axial direction parallel to the longitudinal axis when the valve moves between the closed and open positions.

Further, the concepts described herein can be used to ensure that a filter cartridge with the correct micron efficiency rating is used. The same housing may be used for multiple applications, with the housings having slightly different valves. For example, the engagement features between the filter cartridge and the valve can be varied. One possible embodiment is to change the size of the openings in the end cap of the valve and the size of the projections on the filter cartridge that fit through the openings. Only the correct filter cartridge having the correctly sized projections that are able to extend through the openings and cause rotation of the valve can be used. This prevents the customer from mistakenly using the wrong filter if filters of similar size but different media are available.

In certain designs, the valve can be designed to prevent all flow. In addition, the valve can allow an amount of fuel to get past the valve and into the standpipe when the valve is closed in an amount sufficient to allow the fuel to lubricate downstream components, for example the fuel pump, yet is insufficient to allow the engine to operate. In some designs, the valve can be manufactured to less exacting tolerances since the valve need not completely shut off fuel flow, thereby reducing the cost of manufacture of the valve. In other designs, the valve and/or standpipe can be manufactured with features to permit a controlled amount of flow past the valve when the valve is closed.

DETAILED DESCRIPTION

Figure 1:
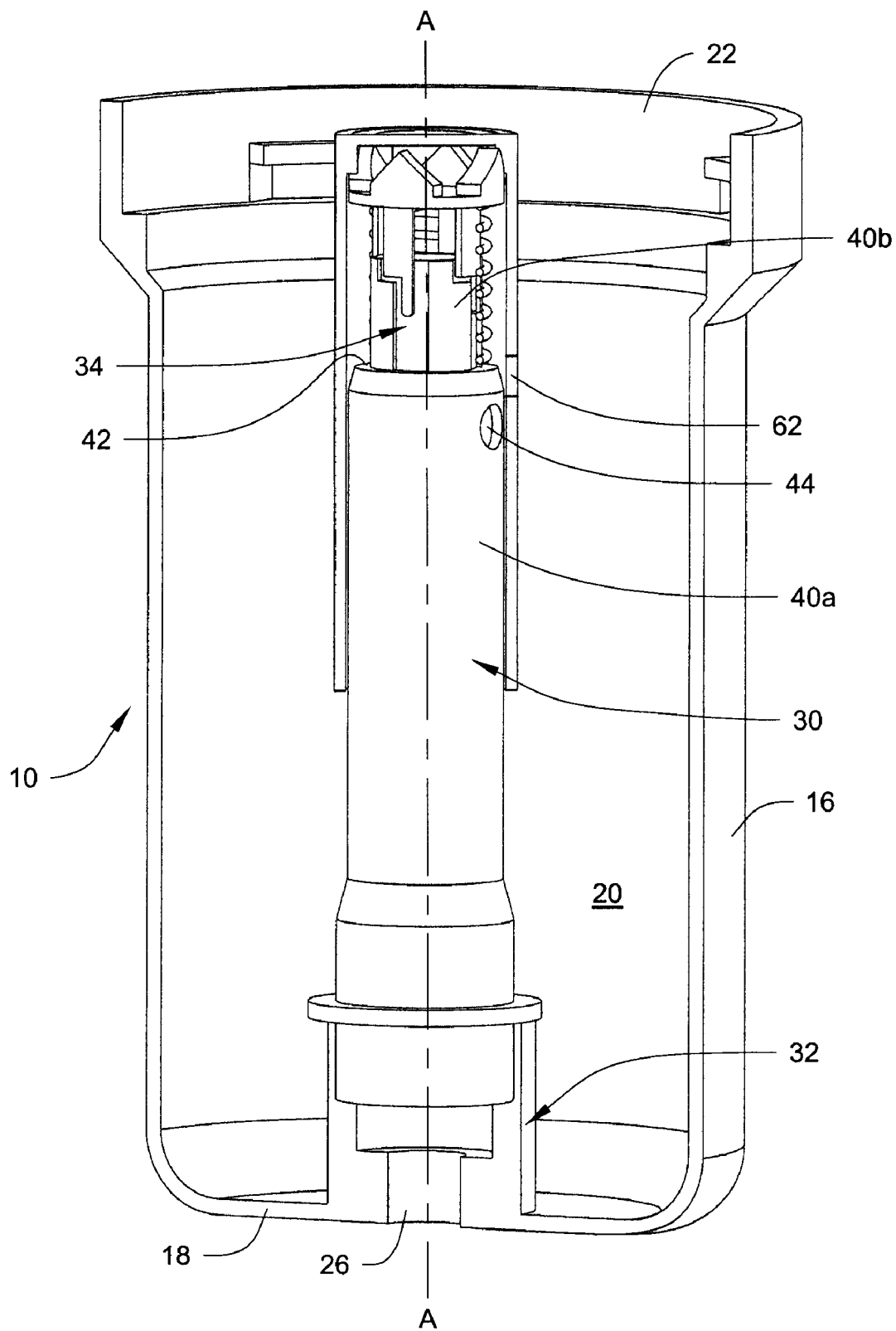
FIG. 1 is a sectional view of a filter housing.

FIG. 1 illustrates a filter housing 10, for example a fuel filter housing, which forms part of a filter assembly that is intended to filter a fluid, for example fuel, prior to the fluid reaching an engine. The housing 10 is designed to receive a filter cartridge 12, illustrated in FIG. 3, therein for filtering the fluid. The description will hereinafter refer to the filter housing 10 as being a fuel filter housing, and that the fluid being filtered is fuel, for example diesel fuel. However, in appropriate circumstances, the concepts described herein can be applied to other types of filter assemblies that filter other types of fluids, for example oil.

The filter housing 10 includes a housing body that has a side wall 16 and an end wall 18. The side wall 16 and the end wall 18 define a filter cartridge space 20 that is large enough to receive the filter cartridge 12 therein, with the end wall 18 forming a closed end of the space 20. The housing body has an open end 22 generally opposite the end wall 18, with the open end 22 in use being closed by a cap (not shown) that closes off the space 20. The housing body also includes an inlet opening (not shown), which can extend, for example, through the side wall 16, and through which fuel to be filtered enters the housing 10, and an outlet 26, illustrated as extending from the end wall 18, through which fuel exits on its way to the engine.

It is to be realized that the filter housing 10 could have other configurations than that described herein.

A standpipe 30 is secured to the end wall 18 and extends upwardly into the space 20 toward the open end 22. In the illustrated embodiment, the standpipe 30 is generally hollow from its end 32 connected to the end wall 18 to a tip end 34 thereof, thereby defining an internal flow passage 36, best seen in FIG. 3. The flow passage 36 is in communication with the outlet 26 so that fuel that enters the standpipe 30 can flow from the standpipe and into the outlet 26 to the engine. The standpipe 30 is disposed generally centrally in the housing 10, with a central axis A-A of the standpipe 30 generally coaxial with a central axis of the space 20.

In the embodiment illustrated in FIG. 1, the standpipe 30 is generally cylindrical and the passage 36 is generally circular along its length when the standpipe 30 is viewed in a cross-section taken perpendicular to the central axis A-A. However, the standpipe 30 and the passage 36 could have other configurations, such as non-cylindrical and non-circular. For example, the passage 36 could be oval in cross-section. In addition, the standpipe 30, the end 32, the tip end 34, the outlet 26, and the passage 36 can be of unitary construction or comprised of multiple parts.

The standpipe 30 includes a section 40a with a generally constant diameter and a section 40b that includes the tip end 34 having a smaller diameter than the section 40a. A shoulder 42 is defined at the juncture of the sections 40a, 40b resulting from the decrease in diameter. One or more openings 44 are formed in the section 40a of the standpipe 30 near the shoulder 42 to place the exterior of the standpipe in communication with the passage 36. In the illustrated embodiment, one opening 44 is present. However, a larger number of openings 44 can be provided.

A flow control valve 50 is disposed on the standpipe 30 adjacent the tip end 34 to control the flow of fuel into the standpipe through the opening 44. The valve 50 is axially moveable between closed (FIG. 2) and open positions, with one or more members on the installed filter cartridge 12 designed to release the valve to permit the movement from the closed position to the open position. A spring 52 biases the valve back to the closed position upon removal of the filter cartridge 12.

Figure 2:
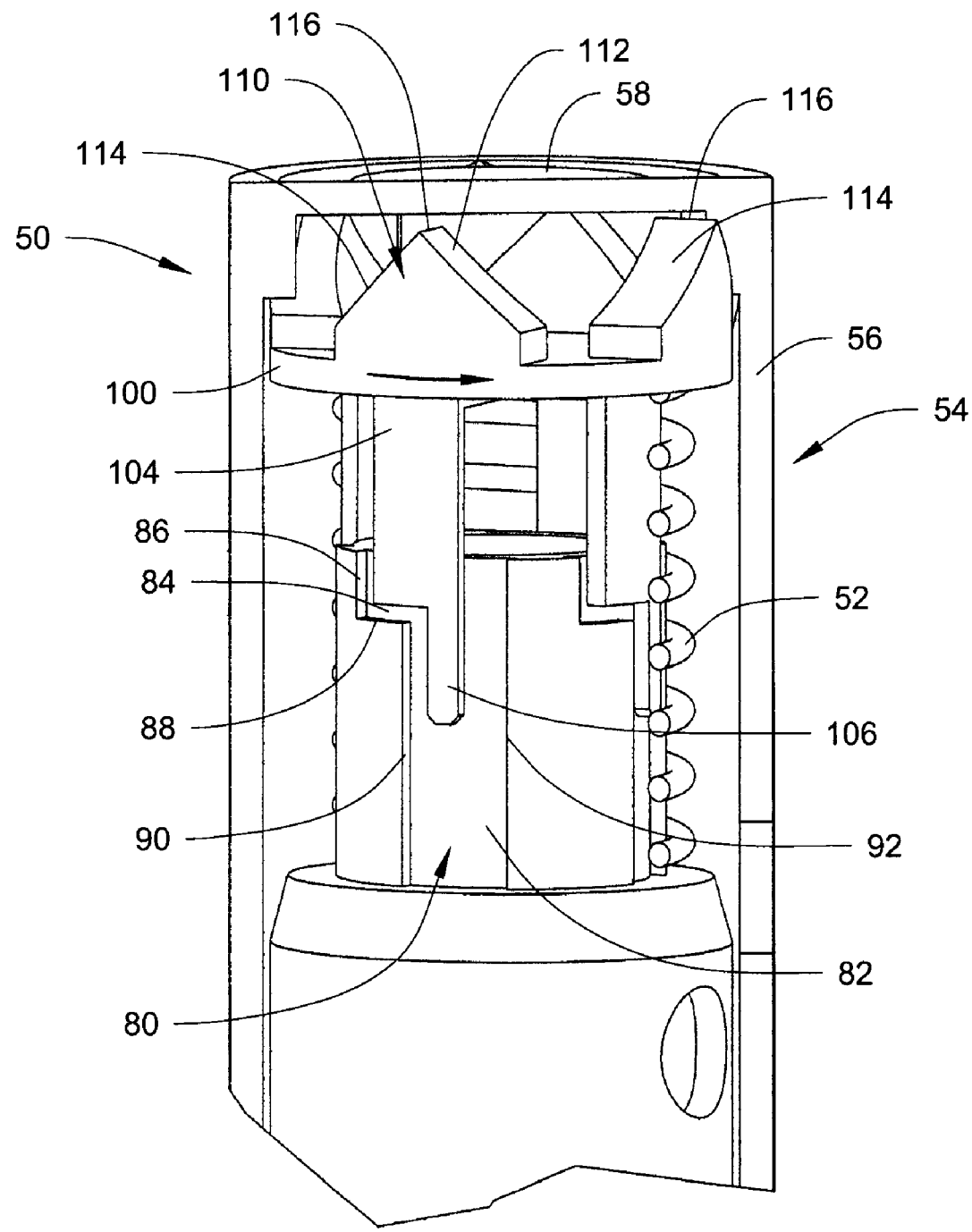
FIG. 2 is a detailed view of the end of the standpipe with the valve.

With reference to FIGS. 1-4, the valve 50 comprises a valve cap 54 having a skirt or sleeve section 56 and a top plate 58, a valve stop 60, and the spring 52 for biasing the valve cap 54 and valve stop 60 to the closed position shown in FIG. 2. The valve cap 54, valve stop 60 and spring 52 are made of materials, the same or different, suitable for exposure to fuel or other type of fluid flowing through the housing 10. For example, these elements can be made of plastic or metal.

As seen in FIGS. 1 and 2, the valve cap 54 covers the tip end 34. The skirt section 56 of the valve cap 54 extends downward and covers approximately half of the section 40a. The skirt section 56 is substantially solid, except for one or more openings 62 extending through the skirt section 56. The opening 62 is located on the skirt section 56 above the location of the opening 44 in the standpipe such that at the closed position shown in FIGS. 1 and 2, the skirt section 56 generally prevents the flow of fuel into the standpipe opening 44. The opening 62 is spaced from the opening 44 such that when the valve cap 54 moves axially downward to an open position, the opening 62 is generally aligned with the opening 44 to allow fuel to flow into the standpipe opening 44. In the illustrated embodiment, one opening 62 is shown, although a larger number of openings can be provided.

Figure 4:
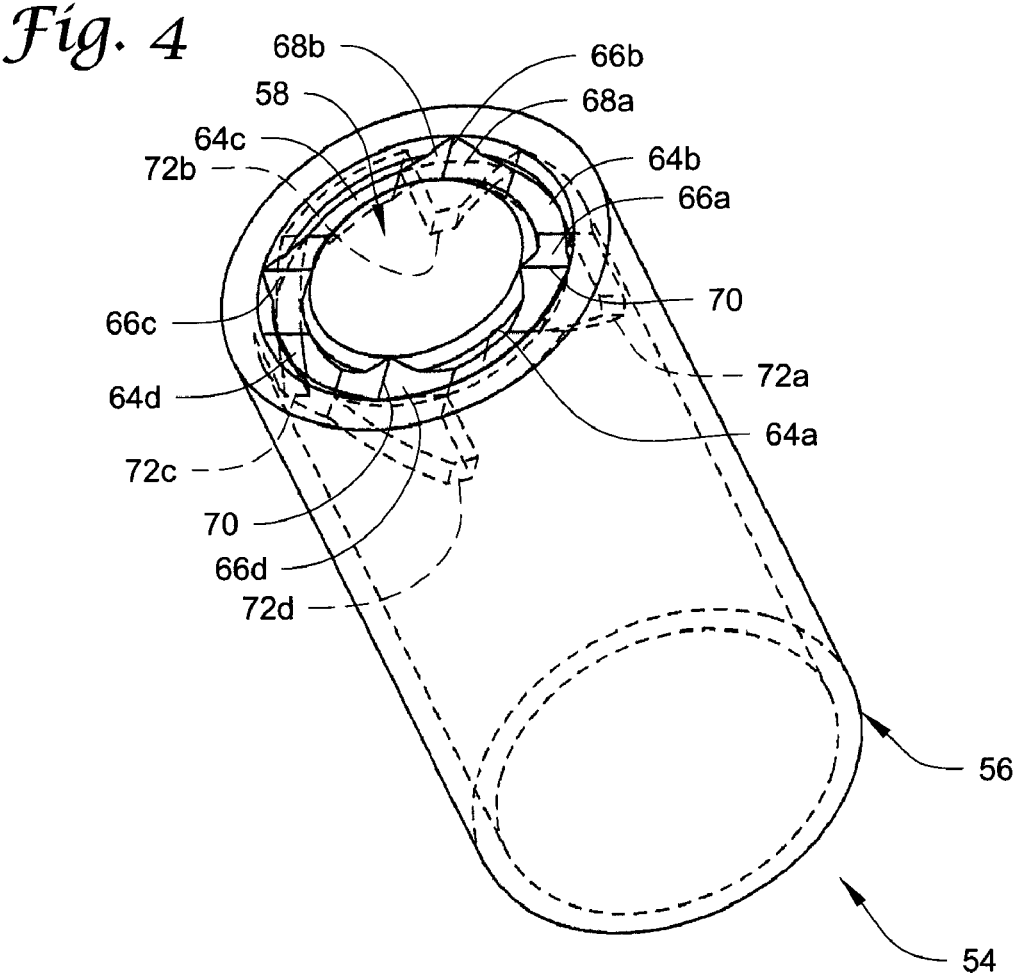
FIG. 4 is a perspective view of the valve cap.

The top plate 58 of the valve cap 54 generally closes the upper end of the skirt section 56. With reference to FIG. 4, the top plate 58 includes a plurality of circumferentially spaced, axially extending openings 64a-d formed therethrough that provide access to the interior of the valve cap 54 through the top plate 58. Between the openings 64a-d are bridges 66a-d that connect a solid, central portion 68 of the top plate with the skirt portion 56. Each bridge 66a-d includes sloped surfaces 68a, b that meet at a common edge 70. The sloped surfaces 68a, b help guide protrusions (described below) provided on the filter cartridge 12 into the openings 64a-d of the valve cap 54 during actuation of the valve 50.

Figure 3:
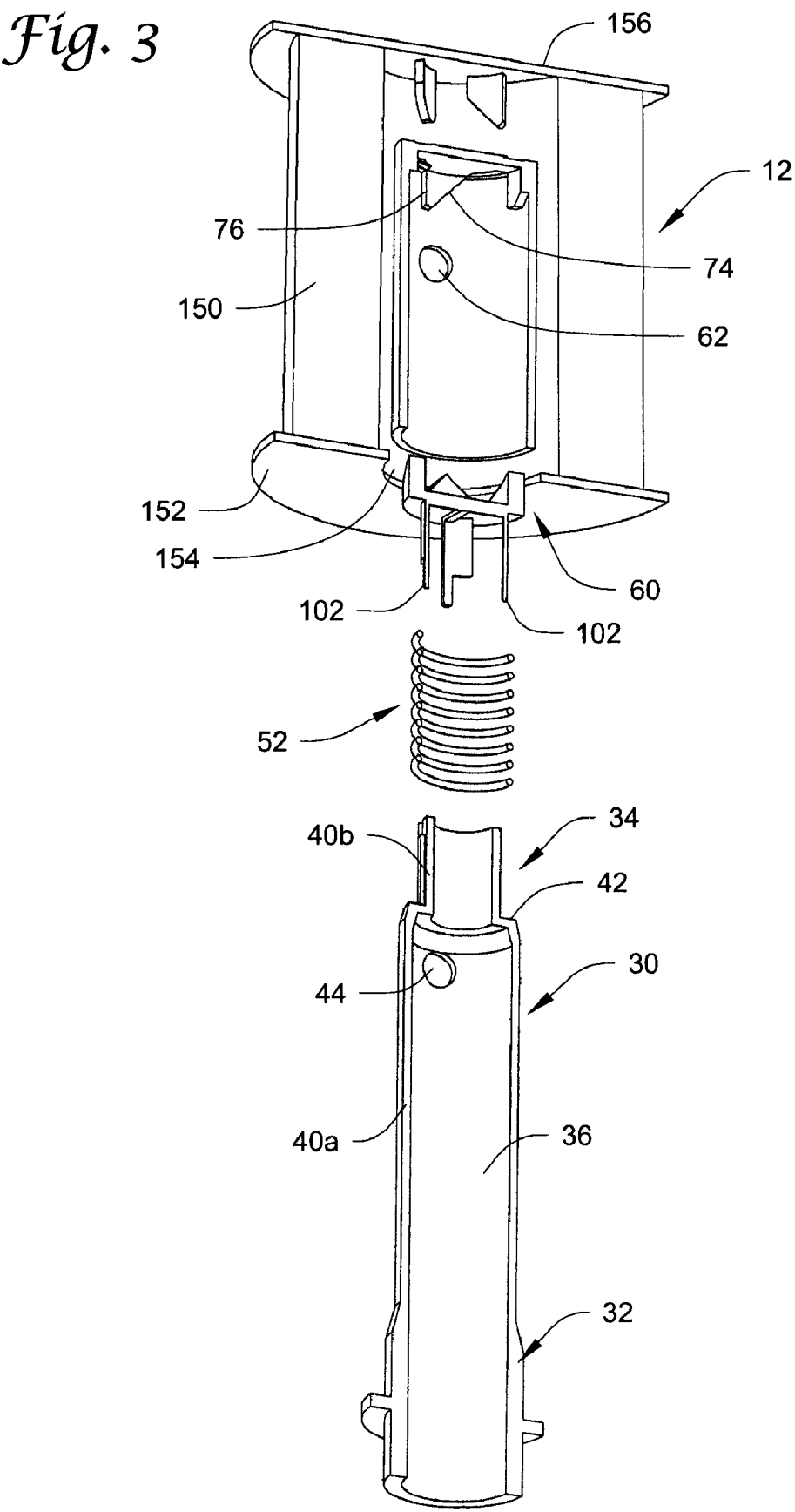
FIG. 3 is an exploded view of the valve components.

A plurality of valve cap protrusions 72a-d are integral with and extend downwardly from the bridges 66a-d. The protrusions 72a-d are spaced from the interior wall of the skirt section 56 and, as shown in FIG. 3, each protrusion includes a sloped edge 74 that is disposed at an acute angle to the axis A-A and to a horizontal axis that is perpendicular to the axis A-A, and an edge 76. The purpose of the edges 74, 76 will be described below.

The valve stop 60 is also disposed on the tip end 34, within the valve cap 54. The valve stop controls axial movement of the valve cap 54 from the closed to the open positions. The tip end 34 of the standpipe 30 is uniquely designed to receive the valve stop 60. In particular, with reference to FIG. 2, the tip end 34 includes four recessed areas 80 thereon that are circumferentially spaced around the diameter of the tip end 34. Each recessed area 80 includes a first component 82 and a second component 84, and each recessed area 80 is bordered by a surface 86, a surface 88, a surface 90, and a surface 92. In the illustrated embodiment, the surfaces 86, 90 and 92 are generally parallel to the axis A-A, while the surface 88 is generally perpendicular to the axis A-A. However, the surfaces 86, 90, 92 need not be generally parallel to the axis A-A, but can be at any angle(s) that are compatible with any mating component surfaces of the valve. Further, the surface 88 need not be generally perpendicular to the axis A-A, but the surface 88 can be at any angle that will mate with the valve properly.

Returning to the valve stop 60 and FIGS. 1-3, the stop 60 comprises a support plate 100. Extending downwardly from the plate 100 are a plurality (in the illustrated embodiment, four) of circumferentially spaced legs 102 that are designed to fit in the recessed areas 80. As best seen in FIG. 2, each leg 102 includes a major portion 104, and a finger 106 that projects downwardly from the end of the major portion 104 at one edge of the major portion 104. The width of the major portion 104 is slightly less than the distance between the surfaces 90, 92. As shown in FIG. 2, at the closed position of the valve 50, the end of the major portion 104 next to the finger 106 will engage the surface 88 and prevent downward movement of the stop 60. The stop 60 must be rotated to the position shown in FIG. 6 so that the major portion 104 clears the surface 88, which will allow the stop 60 to move axially downward until the end of the finger 106 engages the shoulder 42 or the plate 100 engages the end of the tip end 34. In an alternative embodiment, the legs 102 and fingers 106 could be designed to fit on the inside of the tip end 34 of the standpipe 30.

Extending upwardly from the plate 100 are a plurality (in the illustrated embodiment, four) of circumferentially spaced protrusions 110. Each protrusion 110 includes sloped edges 112, 114 that join at edge 116. In the illustrated embodiment, the edges 112, 114 slope at approximately the same angle a (FIG. 6) relative to a vertical axis. The protrusions 110 are designed to be engaged by protrusions on the filter cartridge 12, and when so engaged, cause rotation of the stop 60 in the direction of the arrow in FIG. 2 to the position shown in FIG. 6. If desired, the components can be modified so that the stop rotates in the direction opposite to that indicated in FIG. 2.

Figure 6:
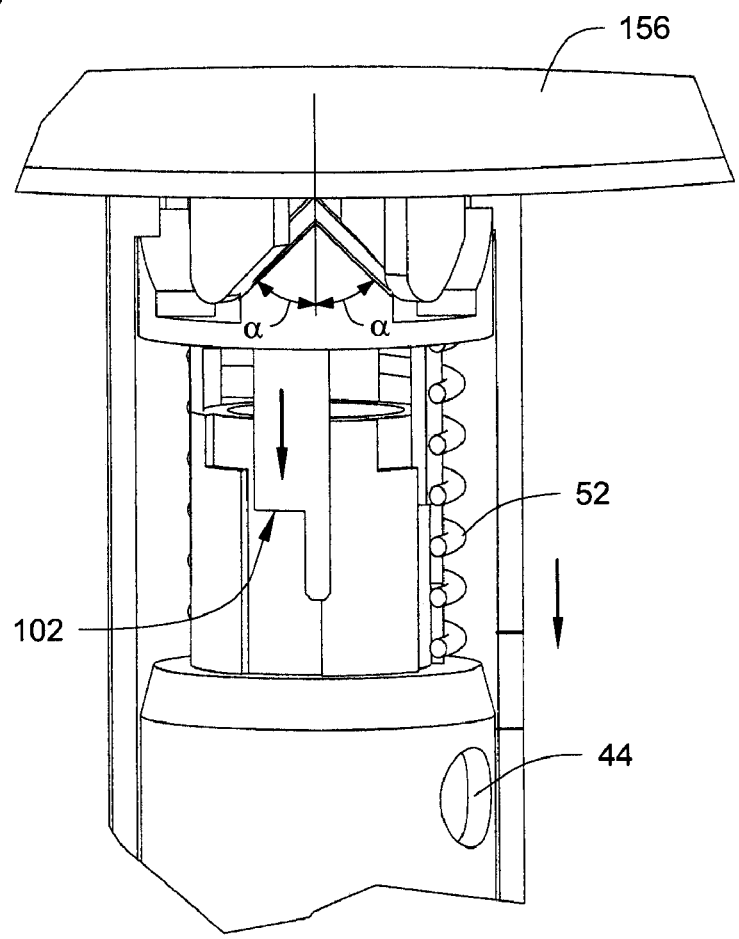
FIG. 6 is a view of the valve actuated by the filter cartridge end plate.

Upon rotation of the stop 60 to the position shown in FIG. 6, the legs 102 clear the surface 88, allowing the stop 60 to drop down axially. Since the valve cap 54 rests on the stop 60, the cap 54 drops down with the stop 60 to align the openings 44, 62.

The spring 52 surrounds the tip end 34 and is engaged between the shoulder 42 and the plate 100 on the stop 60. When the stop 60 and cap 54 move downward, the spring 52 is compressed. As a result, when the filter cartridge 12 is removed, the spring 52 biases the stop 60 and the cap 54 upward.

Rotation of the stop 60 and resulting axial movement of the stop and valve cap 54 occurs as a result of installing the correct filter cartridge 12. Returning to FIG. 3, the cartridge 12 is illustrated schematically in cross-section. The cartridge 12 includes a ring of filter media 150 suitable for filtering fuel. The outside of the filter media 150 defines a dirty or unfiltered fuel side while inside the ring of media 150 is a clean or filtered fuel side. Thus, the filter cartridge is configured for outside-in flow.

A first end cap or plate 152 is secured to the bottom end of the media 150 for generally closing the bottom end of the media. The plate 152 includes an opening 154 therethrough through which the standpipe 30 is inserted upon installation of the filter cartridge 12. A seal (not shown) will typically be provided on the plate 152 to seal with the standpipe 30 to prevent leakage of clean fuel past the plate 152. Alternatively, a seal can be provided between the plate 152 and the bottom of the housing. A second end cap or plate 156 is secured to the opposite end of the media 150 for closing off the opposite end of the media.

Figure 5:
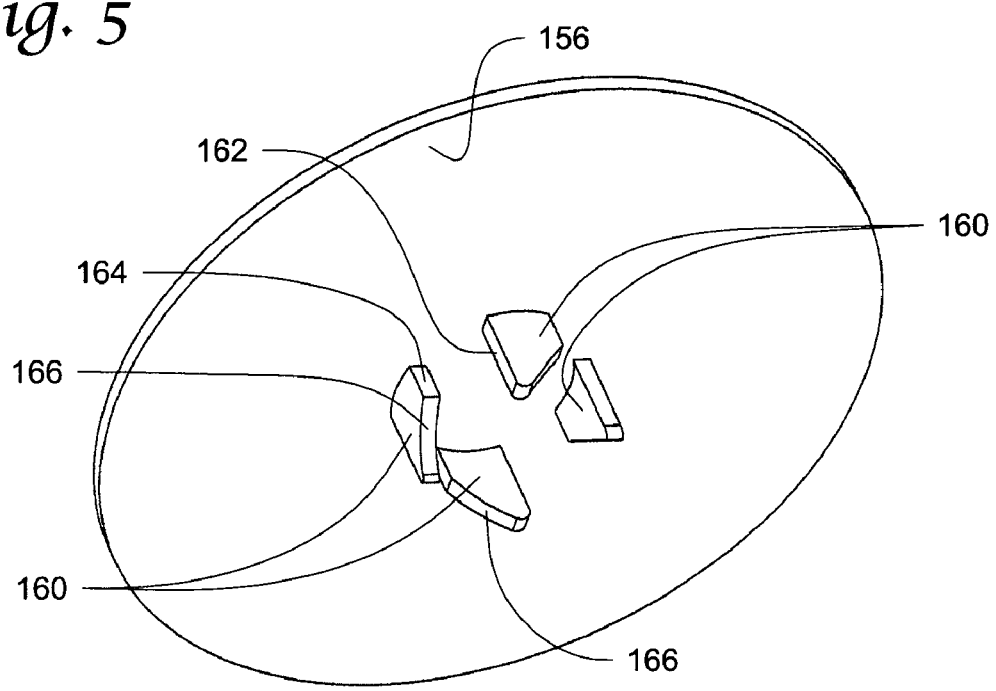
FIG. 5 is a perspective view of an embodiment of an end plate on a filter cartridge used to actuate the valve.

With reference to FIGS. 3 and 5, the plate 156 is illustrated as being generally flat and planar. However, the plate 156 includes a plurality of projections 160, for example four, that project generally parallel to the axis A-A downwardly into the interior space of the media 150 from the bottom surface of the plate 156. The projections 160 are illustrated as being circumferentially spaced from each other, and spaced from the center of the plate 156.

The projections 160 are positioned and shaped to extend through the axial openings 64*a-d* in the top plate 58 of the valve cap 54, and to engage with the protrusions 110 on the valve stop 60 in order to rotate the valve stop. Any configuration of the projections 160 capable of engaging with the protrusions 110 to cause rotation of the valve stop 60 can be used. As illustrated, each projection 160 includes a first axial edge 162 extending generally parallel to the axis A-A, a second axial edge 164, and a sloped actuating edge 166 that extends at an acute angle to the axis A-A.

Upon installation of the filter cartridge 12, the projections 160 enter into the valve cap 54 through the openings 64*a-d*. The sloped surfaces 68*a*, *b* on the bridges 66*a-d* help guide the projections into the openings when installing the cartridge 12. During installation, the sloped actuating edges 166 engage the sloped edges 114 on the protrusions 110. The engagement between the edges 114, 166 creates a sideways force that causes the valve stop 60 to rotate to the position shown in FIG. 6. The stop 60 and the valve cap 54, together with the filter cartridge 12, can then move down axially to align the openings 44, 62.

Upon removal of the filter cartridge 12, the spring 52 will bias the valve stop 60 upward. Simultaneously, the sloped edges 112 on the protrusions 110 will engage the sloped edges 74 on the protrusions 72*a-d* of the valve cap 54, which causes the valve stop 60 to rotate back to its position shown in FIG. 2, i.e. the closed position. The edges 76 limit rotation of the valve cap 54 by engaging with the protrusions 110. If a standard filter cartridge without suitable protrusions is installed, the valve stop and valve cap 54 will not slide down the standpipe, and the filter cartridge will project upward from the housing 10 and prevent installation of the housing cover. This will act as a sign that the incorrect filter cartridge has been installed.

The valve described herein can permit a certain amount of fuel flow into the standpipe when the valve is at the closed position. The amount of fuel allowed past the valve should be insufficient to permit engine operation, and in certain embodiments can be insufficient to lubricate downstream components, for example the fuel pump in the case of diesel fuel. In another embodiment, the amount of fuel permitted past the valve when closed can be sufficient to provide lubrication to downstream components, for example the fuel pump, in the case of diesel fuel, yet be insufficient to permit engine operation. Since fuel flow need not be completely prevented, the valve components described herein can be manufactured to less exacting tolerances. This permits reduction in the cost of manufacture of the valve components, especially the valve cap, since they need not fit closely with the standpipe. If fuel flow must be prevented entirely, the components can be manufactured to more exacting tolerances and/or suitable sealing can be provided.

Figure 7:
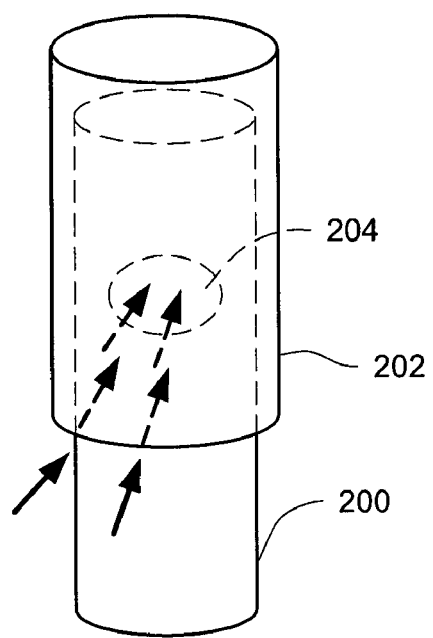
FIG. 7 illustrates a valve that allows a controlled amount of fuel into the standpipe when the valve is closed.

An example of fuel flowing past the valve when closed is illustrated schematically in FIG. 7. A standpipe 200 has a valve 202 around it which controls flow into a standpipe opening 204. The valve 202 can be configured similarly to the valve 50, or the valve 202 can just be a sleeve. The valve 202 is designed to be axially moveable on the standpipe 200 between a closed position shown in FIG. 7 and an open position. When the valve 202 is at the closed position in FIG. 7, a controlled amount of fuel can flow into the standpipe through space between the valve 202 and the outside of the standpipe 200 as shown by the arrows. The fuel entering the standpipe, if sufficient, can provide lubrication to downstream components, for example the fuel pump. However, the amount of fuel entering the standpipe is insufficient to permit engine operation. In this embodiment, the tolerances between the outer surface of the standpipe 200 and the inner surface of the valve 202 need not be precise and the valve need not closely fit on the standpipe. As a result, the valve can be manufactured at less cost.

In other designs, the valve cap and/or standpipe can be manufactured with features to permit fuel to pass when the valve is closed. For example, grooves or channels could be provided on the valve cap and/or the standpipe to permit fuel past the valve when the valve is at the closed position.

Therefore, the word prevention as used herein in the summary, detailed description, and claims, unless indicated otherwise, is meant to include complete shut off of fuel into the standpipe as well as including some passage of fuel into the standpipe, as long as the amount of fuel that passes is insufficient to permit engine operation.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter housing comprising:
   a housing body having a side wall and an end wall defining a filter cartridge space, the end wall forming a closed end of the filter cartridge space, and the body having an open end opposite the end wall;
   a standpipe extending from the end wall along a longitudinal axis into the filter cartridge space toward the open end, the standpipe including an internal flow passage, and at least one opening in the standpipe that places the internal flow passage in communication with the filter cartridge space; and
   the standpipe includes a valve, the valve having a component that has a first position at which flow through the flow passage is generally prevented by the valve and a second position at which a greater amount of flow through the flow passage is permitted by the valve, and the component rotates about the longitudinal axis when it moves from the first position to the second position and from the second position to the first position.

2. The filter housing of claim 1, wherein the component is moveable axially in a direction parallel to the longitudinal axis.

3. The filter housing of claim 2, wherein the valve includes a valve cap that is movable axially, and the valve cap includes a sleeve portion with an opening that aligns with the standpipe opening when the component is at the second position.

4. The filter housing of claim 2, wherein the component is a valve stop.

5. The filter housing of claim 1, further including a spring that biases the component to the first position.

6. The filter housing of claim 1, wherein the standpipe includes a distal end that is at a position closer to the open end of the housing body than to the end wall of the housing body, and the valve is adjacent the distal end.

7. The filter housing of claim 1, wherein the valve is disposed on an exterior of the standpipe outside the internal flow passage.

8. A filter housing comprising:
   a housing body defining a filter cartridge space;
   a standpipe extending into the filter cartridge space along a longitudinal axis, the standpipe including an internal flow passage, and an opening in the standpipe that places the internal flow passage in communication with the filter cartridge space; and
   a valve disposed on an exterior of the standpipe outside the internal flow passage, the valve is moveable between a closed position at which flow through the flow passage is generally prevented and an open position at which a greater amount of flow through the flow passage is permitted, the valve including a valve stop that is mounted so as to rotate about the longitudinal axis when the valve moves between the closed and open positions and a valve cap engaged with the valve stop, and the valve stop and the valve cap are movable in an axial direction parallel to the longitudinal axis when the valve moves between the closed and open positions.

9. The filter housing of claim 8, wherein the valve cap includes a sleeve portion with an opening that aligns with the standpipe opening when the valve is at the open position.

10. The filter housing of claim 8, further including a spring that biases the valve to the closed position.

11. The filter housing of claim 8, wherein the standpipe includes a distal end that is at a position closer to an open end of the housing body than to an end wall of the housing body, and the valve is adjacent the distal end.

12. A filter assembly, comprising:
   a filter housing including:
      a housing body having a side wall and an end wall defining a filter cartridge space, the end wall forming a closed end of the filter cartridge space, and the body having an open end opposite the end wall;
      a standpipe extending from the end wall along a longitudinal axis into the filter cartridge space toward the open end, the standpipe including an internal flow passage, and at least one opening in the standpipe that places the internal flow passage in communication with the filter cartridge space;
      the standpipe includes a valve, the valve having a component that has a first position at which flow through the flow passage is generally prevented by the valve and a second position at which a greater amount of flow through the flow passage is permitted by the valve, and the component rotates about the longitudinal axis when it moves from the first position to the second position and from the second position to the first position;
   a filter cartridge disposed in the filter cartridge space, the filter cartridge including:
      a ring of filter media defining an interior space;
      a first end cap secured to an end of the filter media, the first end cap including a standpipe opening through which the standpipe extends; and
      a second end cap secured to an opposite end of the filter media, the second end cap including at least one protrusion extending therefrom into the interior space at a position offset from a center of the second end cap, the protrusion engaging with the valve component to rotate the valve component.

13. The filter assembly of claim 12, wherein the protrusion comprises an angled actuating edge that is at an acute angle relative to the central axis; the valve component comprises a valve stop that includes an angled engagement surface that is engaged with the angled actuating surface, and the valve includes a valve cap with an opening through which the protrusion extends.

14. The filter assembly of claim 13, wherein the valve cap and the valve stop are moveable axially in a direction parallel to the longitudinal axis.

15. The filter assembly of claim 13, wherein the valve cap includes a sleeve portion with an opening that aligns with the standpipe opening when the valve component is at the second position.

16. The filter assembly of claim 12, further including a spring that biases the valve component to the first position.

17. The filter assembly of claim 12, wherein the standpipe includes a distal end that is at a position closer to the open end of the housing body than to the end wall of the housing body, and the valve is adjacent the distal end.

18. The filter assembly of claim 12, wherein the valve is disposed on an exterior of the standpipe outside the internal flow passage.

* * * * *